United States Patent
Tokyo

(10) Patent No.: US 12,086,349 B2
(45) Date of Patent: Sep. 10, 2024

(54) INFORMATION PROCESSING APPARATUS, TOUCH DEVICE, AND CONTROL METHOD

(71) Applicant: Lenovo (Singapore) Pte. Ltd., Singapore (SG)

(72) Inventor: Asahi Tokyo, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/346,175

(22) Filed: Jun. 30, 2023

(65) Prior Publication Data

US 2024/0028152 A1 Jan. 25, 2024

(30) Foreign Application Priority Data

Jul. 22, 2022 (JP) .................................. 2022-116994

(51) Int. Cl.
*G06F 3/041* (2006.01)
*G06F 3/044* (2006.01)

(52) U.S. Cl.
CPC ........ *G06F 3/04162* (2019.05); *G06F 3/0442* (2019.05)

(58) Field of Classification Search
CPC ............................ G06F 3/04162; G06F 3/0442
See application file for complete search history.

(56) References Cited

U.S. PATENT DOCUMENTS

| 2018/0350124 A1* | 12/2018 | Thimbleby ........... G06F 3/0416 |
| 2020/0110477 A1* | 4/2020 | Park ..................... G06F 3/03545 |
| 2021/0055808 A1* | 2/2021 | Kato ..................... G06F 3/046 |
| 2022/0221961 A1 | 7/2022 | Yao et al. |

FOREIGN PATENT DOCUMENTS

| JP | 2016-62205 A | 4/2016 |
| JP | 2018-032428 A | 3/2018 |
| JP | 2021-33543 A | 3/2021 |
| JP | 2021-61044 A | 4/2021 |

* cited by examiner

Primary Examiner — Matthew A Eason
Assistant Examiner — Chayce R Bibbee
(74) Attorney, Agent, or Firm — Osha Bergman Watanabe & Burton LLP

(57) ABSTRACT

An information processing apparatus includes a touch device, and a main controller that processes a pen input and a touch input. The touch device includes a touch sensor for detecting a contact position of a finger and a contact position of a pen on a screen of a display, a wireless communication for detecting an approach of the pen and a position of the pen on the screen, and a detection controller operable, in a state where an approach of the pen is detected and the pen is not in contact with the screen and the finger is in contact with the screen, to detect in a first mode in which pen input detection and touch input detection are performed in a time-division manner, and to change the mode to a second mode in which the pen input detection is performed for an entire detection period.

5 Claims, 9 Drawing Sheets

|  | STATE | SAMPLING RATE IN PEN INPUT DETECTION | SAMPLING RATE IN TOUCH INPUT DETECTION | DETECTION MODE |
|---|---|---|---|---|
| COMPARATIVE TECHNOLOGY | STATE A | SR1 | SR2 | TIME DIVISION DETECTION MODE |
|  | STATE B | SR1 | SR2 | TIME DIVISION DETECTION MODE |
| PRESENT EMBODIMENT | STATE A | SR3(>SR1) | 0 | FULL PERIOD PEN DETECTION MODE |
|  | STATE B | SR1 | SR2 | TIME DIVISION DETECTION MODE |

FIG. 10

INFORMATION PROCESSING APPARATUS, TOUCH DEVICE, AND CONTROL METHOD

CROSS-REFERENCE TO RELATED APPLICATIONS

This application claims priority to Japanese Patent Application No. 2022-116994 filed on Jul. 22, 2022, the contents of which are hereby incorporated herein by reference in their entirety.

BACKGROUND OF THE INVENTION

Field of the Invention

The present invention relates to an information processing apparatus, a touch device, and a control method.

Description of the Related Art

Conventionally, information processing apparatuses such as tablet terminals and laptop personal computers (PCs) are capable of supporting pen input operations using a dedicated pen and touch input operations such as flicking, pinching, and scrolling using a finger. In such information processing apparatuses, it has been common to accept and exclusively use the first detected one of pen input detection for a pen input operation and touch input detection for a touch input operation (see, for example, Japanese Unexamined Patent Application Publication No. 2018-32428). For touch devices used in information processing apparatuses, there is a known technology that uses a common touch sensor to perform both pen input detection and touch input detection.

Meanwhile, in recent years, information processing apparatuses such as those described above have been required to support both the pen input operation and the touch input operation simultaneously. However, in the information processing apparatuses as described above, if the pen input operation and the touch input operation are supported simultaneously by using a common touch sensor for the pen input detection and the touch input detection, a sufficient sampling rate may not be achieved because the pen input detection and the touch input detection are performed in a time-division manner.

SUMMARY OF THE INVENTION

One or more embodiments of the present invention provide an information processing apparatus, a touch device, and a control method capable of achieving a high sampling rate even in the case where a pen input operation and a touch input operation are performed simultaneously.

The first aspect of the present invention is an information processing apparatus which includes: a touch device; and a main control unit (main controller) that executes processing based on an operating system (OS), the main control unit executing processing of a pen input operation based on pen input detection data detected by the touch device and processing of a touch input operation based on touch input detection data detected by the touch device; wherein the touch device includes a display unit (display), a touch sensor disposed on a screen of the display unit and capable of detecting a contact position of a finger and a contact position of a pen on the screen in a shared manner, a wireless communication unit (wireless communication) capable of detecting an approach of the pen that has approached within a threshold distance on the screen of the display unit and a position of the pen on the screen by contactless data communication with the pen, and a detection control unit (detection controller) that controls pen input detection using the touch sensor and the wireless communication unit and touch input detection based on a contact of the finger by the touch sensor, the detection control unit being operable, in a state where an approach of the pen is detected and the pen is not in contact with the screen and the finger is in contact with the screen, to execute detection in a first mode in which the pen input detection and the touch input detection are performed in a time-division manner, and, in response to a transition to a state where the pen is in contact with the screen and the finger is in contact with the screen, to change the mode to a second mode in which the pen input detection is performed for an entire detection period.

In the information processing apparatus according to the first aspect of the present invention, the detection control unit may execute detection in the first mode in a case where no approach of the pen is detected and the finger is in contact with the screen, or in a case where the approach of the pen is detected and the finger is not in contact with the screen.

In the information processing apparatus according to the first aspect of the present invention, in a case where a setting is made in the OS to disable the touch input operation while the pen is to be used, the main control unit may execute processing to ignore the touch input detection data while the pen input detection is performed.

The second aspect of the present invention is a touch device which includes: a display unit; a touch sensor disposed on a screen of the display unit and capable of detecting a contact position of a finger and a contact position of a pen on the screen in a shared manner; a wireless communication unit capable of detecting an approach of the pen that has approached within a threshold distance on the screen of the display unit and a position of the pen on the screen by contactless data communication with the pen; and a detection control unit that controls pen input detection using the touch sensor and the wireless communication unit and touch input detection based on a contact of the finger by the touch sensor, the detection control unit being operable, in a state where an approach of the pen is detected and the pen is not in contact with the screen and the finger is in contact with the screen, to execute detection in a first mode in which the pen input detection and the touch input detection are performed in a time-division manner, and, in response to a transition to a state where the pen is in contact with the screen and the finger is in contact with the screen, to change the mode to a second mode in which the pen input detection is performed for an entire detection period.

The third aspect of the present invention is a control method for controlling a touch device, the touch device including a display unit, a touch sensor disposed on a screen of the display unit and capable of detecting a contact position of a finger and a contact position of a pen on the screen in a shared manner, a wireless communication unit capable of detecting an approach of the pen that has approached within a threshold distance on the screen of the display unit and a position of the pen on the screen by contactless data communication with the pen, and a detection control unit that controls pen input detection using the touch sensor and the wireless communication unit and touch input detection based on a contact of the finger by the touch sensor, the method including, by the detection control unit: in a state where an approach of the pen is detected and the pen is not in contact with the screen and the finger is in contact with the screen, executing detection in a first mode in which the pen input detection and the touch input detection are performed in a time-division manner; and in response to a transition to a state where the pen is in contact with the screen and the finger is in contact with the screen, changing the mode to a second mode in which the pen input detection is performed for an entire detection period.

The above-described aspects of the present invention can achieve a high sampling rate even in the case where a pen input operation and a touch input operation are performed simultaneously.

BRIEF DESCRIPTION OF THE DRAWINGS

FIG. 10 is a diagram illustrating an example of the effects of the laptop PC according to one or more embodiments.

DETAILED DESCRIPTION OF THE INVENTION

An information processing apparatus, a touch device, and a control method according to one or more embodiments of the present invention will be described below with reference to the drawings.

Figure 1:
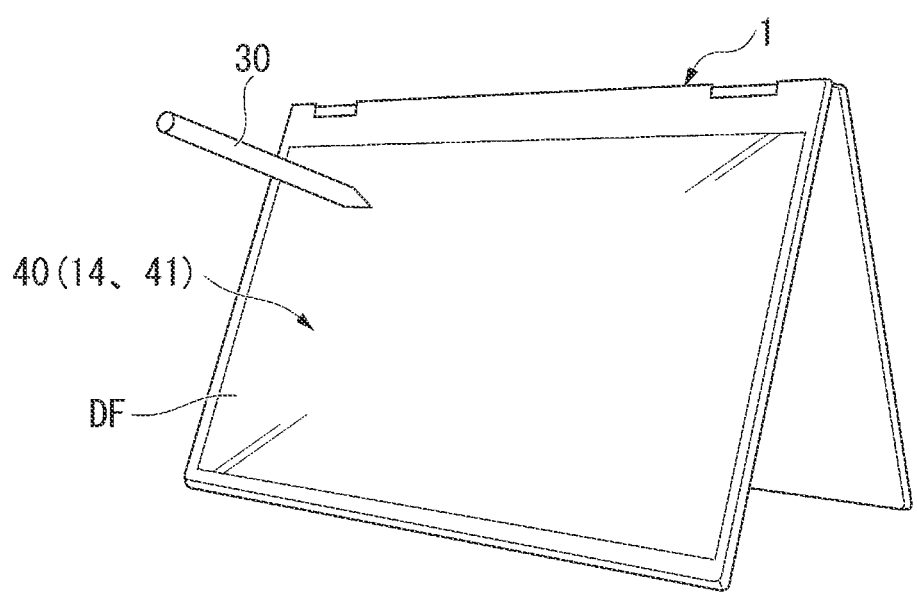
FIG. 1 is an external view illustrating an example of a laptop PC according to one or more embodiments.

FIG. 1 is an external view illustrating an example of a laptop PC 1 according to one or more embodiments.

As illustrated in FIG. 1, the laptop PC 1 includes a touch device 40 capable of inputting with a pen 30. In one or more embodiments, the laptop PC 1 is an example of the information processing apparatus.

The laptop PC 1, when folded with a screen DF of its display unit 14 facing outward, can be used as a terminal of a tent mode form capable of both pen input operations with the pen 30 and touch input operations with a finger or the like.

The touch device 40, which is, for example, a touch screen, includes the display unit 14 and a touch sensor 41. Details of the configuration of the touch device 40 will be described later.

The display unit 14, which is, for example, a liquid crystal display or an organic electro-luminescence (EL) display, displays various information according to the information processing of the laptop PC 1. The display unit 14 is configured as a part of the touch device 40.

A main hardware configuration of the laptop PC 1 will now be described with reference to FIG. 2.

Figure 2:
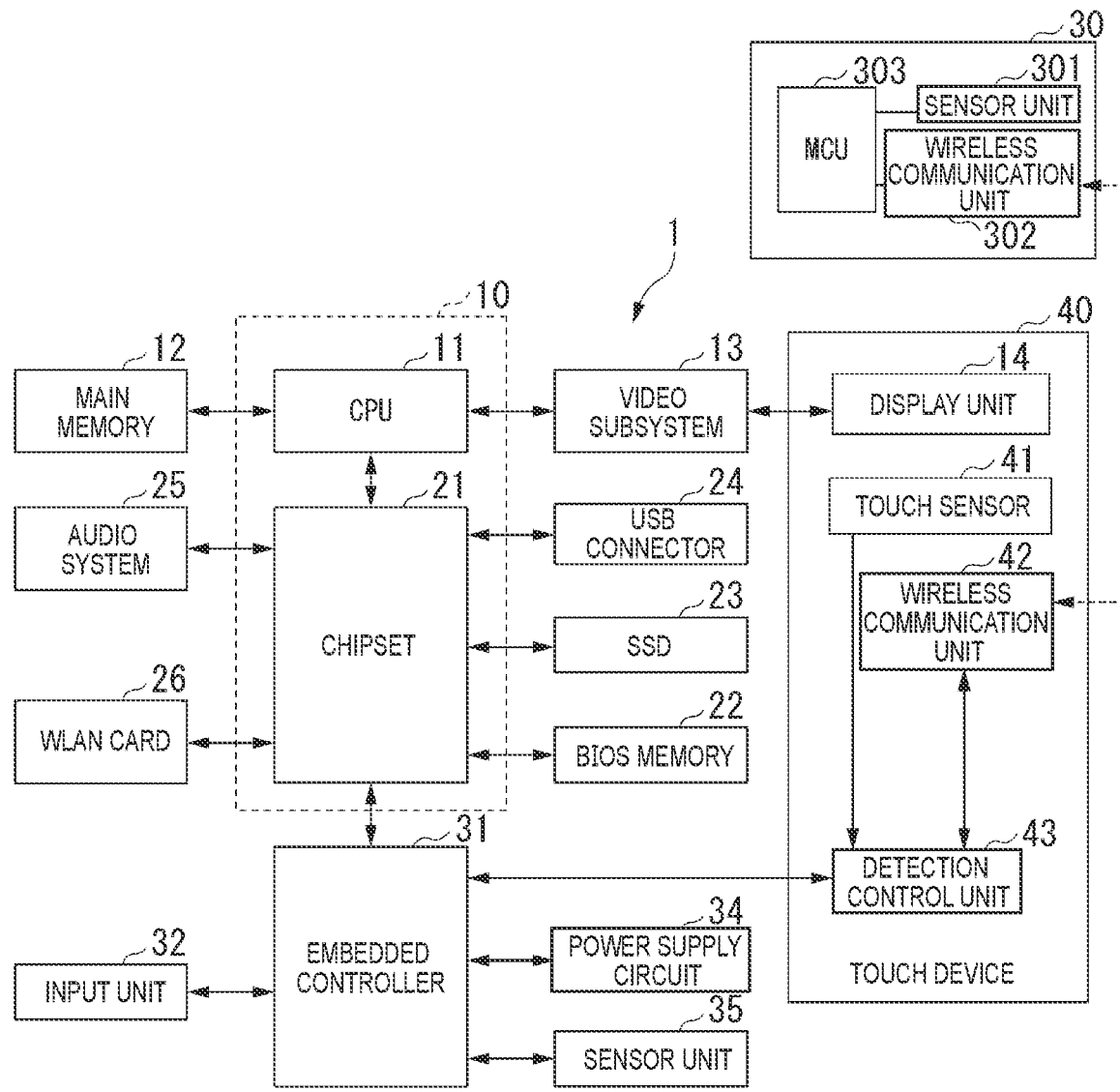
FIG. 2 is a diagram illustrating an example of a main hardware configuration of the laptop PC according to one or more embodiments.

FIG. 2 is a diagram illustrating an example of the main hardware configuration of the laptop PC 1 according to one or more embodiments.

The laptop PC 1 is an information processing apparatus with Windows (registered trademark), for example, as an operating system (OS). The laptop PC 1 can be used in a normal laptop PC form, a tablet terminal form, and the tent mode form as illustrated in FIG. 1.

As illustrated in FIG. 2, the laptop PC 1 includes a CPU 11, a main memory 12, a video subsystem 13, a chipset 21, a BIOS memory 22, an SSD 23, a USB connector 24, an audio system 25, a WLAN card 26, the pen 30, an embedded controller 31, an input unit 32, a power supply circuit 34, a sensor unit 35, and the touch device 40.

The central processing unit (CPU) 11 executes various types of arithmetic processing under program control to control the entire laptop PC 1.

The main memory 12 is a writable memory used as an area for reading an executable program of the CPU 11 or as a working area for writing processing data of an executable program. The main memory 12 is composed of, for example, a plurality of dynamic random access memory (DRAM) chips. The executable program includes an OS, various device drivers for hardware operation of peripheral devices, various services/utilities, application programs (application software), and the like.

The video subsystem 13 is a subsystem for implementing functions related to image display, and includes a video controller. The video controller processes drawing instructions from the CPU 11, writes the processed drawing information into a video memory, reads the drawing information from the video memory, and outputs the read drawing information as drawing data (display data) to the display unit 14.

The display unit 14 is a main display unit of the laptop PC 1, and displays a display screen based on the drawing data (display data) output from the video subsystem 13. The display unit 14 is configured as a part of the touch device 40, as illustrated in FIG. 1 explained above.

The chipset 21 includes controllers of universal serial bus (USB), serial AT attachment (ATA), serial peripheral interface (SPI) bus, peripheral component interconnect (PCI) bus, PCI-Express bus, low pin count (LPC) bus, and the like, and has a plurality of devices connected thereto. In FIG. 2, as examples of the devices, the BIOS memory 22, the SSD 23, the USB connector 24, the audio system 25, the WLAN card 26, and the embedded controller 31 are connected to the chipset 21.

The basic input/output system (BIOS) memory 22 is composed of, for example, an electrically rewritable non-volatile memory such as an electrically erasable programmable read only memory (EEPROM), a flash ROM, or the like. The BIOS memory 22 stores a BIOS and system firmware for controlling the embedded controller 31 and the like.

The solid state drive (SSD) 23 (an example of a non-volatile storage device) stores an OS, various drivers, various services/utilities, application programs (hereinafter, sometimes referred to as applications), and various types of data.

The USB connector 24 is a connector for connecting peripheral devices that use USB.

The audio system 25 records, reproduces, and outputs sound data.

The wireless local area network (WLAN) card 26 is connected to a network via a wireless LAN to perform data communication. For example, upon receiving data from the network, the WLAN card 26 generates an event trigger indicating the receipt of data.

The embedded controller 31 is a one-chip microcomputer that monitors and controls various devices (peripherals, sensors, and the like), regardless of the system state of the laptop PC 1. The embedded controller 31 also has a power supply management function for controlling the power supply circuit 34. The embedded controller 31 is composed of a CPU, a ROM, a RAM, and the like (not illustrated), and also includes a plurality of channels of A/D input terminals, D/A output terminals, timers, and digital input/output terminals. The input unit 32, the touch device 40, the power supply circuit 34, and the sensor unit 35, for example, are connected to the embedded controller 31 via these input/output terminals, and the embedded controller 31 controls the operations thereof.

The input unit 32 is, for example, an input device such as a power switch, pointing device, keyboard, and the like.

The power supply circuit 34 includes, for example, a DC/DC converter, a charge/discharge unit, a battery unit, an AC/DC adapter, and the like, and converts a DC voltage supplied from the AC/DC adapter or the battery unit into a plurality of voltages required to operate the laptop PC 1. Further, the power supply circuit 34 supplies power to each component of the laptop PC 1 in accordance with the control from the embedded controller 31.

The sensor unit 35, which is, for example, an acceleration sensor, a gyro sensor, or the like, detects a screen display orientation indicative of the state of use of the laptop PC 1. The sensor unit 35 detects the direction of gravitational acceleration, for example, to detect the screen display orientation of the laptop PC 1 (display unit 14).

In one or more embodiments, the CPU 11 and the chipset 21 described above correspond to a main control unit 10. The main control unit 10 executes processing based on an OS (for example, Windows (registered trademark)).

The pen 30 is a pen-shaped manipulation medium, such as a touch pen, a stylus pen, or the like. The pen 30 is communicable with the touch device 40 via wireless communication, and transmits information on a contact of the tip of the pen 30 with the screen DF of the display unit 14, the angle of the pen 30, and the like to the touch device 40. The pen 30 includes a sensor unit 301, a wireless communication unit 302, and an MCU 303.

The sensor unit 301 detects a contact pressure of the tip of the pen 30, an orientation or angle (tilt) of the pen 30, and the like.

The wireless communication unit 302, which is, for example, a Bluetooth (registered trademark) module, performs wireless communication between the laptop PC 1 and the pen 30.

The micro controller unit (MCU) 303 includes a CPU, a memory such as a ROM or a RAM, and I/O-related elements, and controls the pen 30 in a comprehensive manner. The MCU 303 transmits various information detected by the sensor unit 301, for example, to the laptop PC 1 via the wireless communication unit 302.

The touch device 40 includes the display unit 14, the touch sensor 41, a wireless communication unit 42, and a detection control unit 43.

The touch sensor 41, which is, for example, a capacitive sensor, is disposed on the screen DF of the display unit 14 and is capable of detecting a contact position of a finger and a contact position of the pen 30 on the screen DF in a shared manner. Here, the contact position is, for example, positional information such as two-dimensional coordinates on a detection surface (screen DF) of the touch sensor 41.

The wireless communication unit 42, which is, for example, a Bluetooth (registered trademark) module, performs wireless communication between the pen 30 and the laptop PC 1. The wireless communication unit 42 is capable of detecting an approach of the pen 30 that has approached within a threshold distance on the screen DF of the display unit 14 and a position of the pen 30 on the screen DF by contactless data communication with the pen 30.

The detection control unit 43 is a processor that includes a CPU (not illustrated) and a memory (not illustrated). The detection control unit 43 causes the CPU to execute a program stored in the memory to execute various processing of the touch device 40. The detection control unit 43 controls pen input detection using the touch sensor 41 and the wireless communication unit 42, and touch input detection based on a contact of the finger by the touch sensor 41.

The functional configuration of the laptop PC 1 according to one or more embodiments will now be described with reference to FIG. 3.

Figure 3:
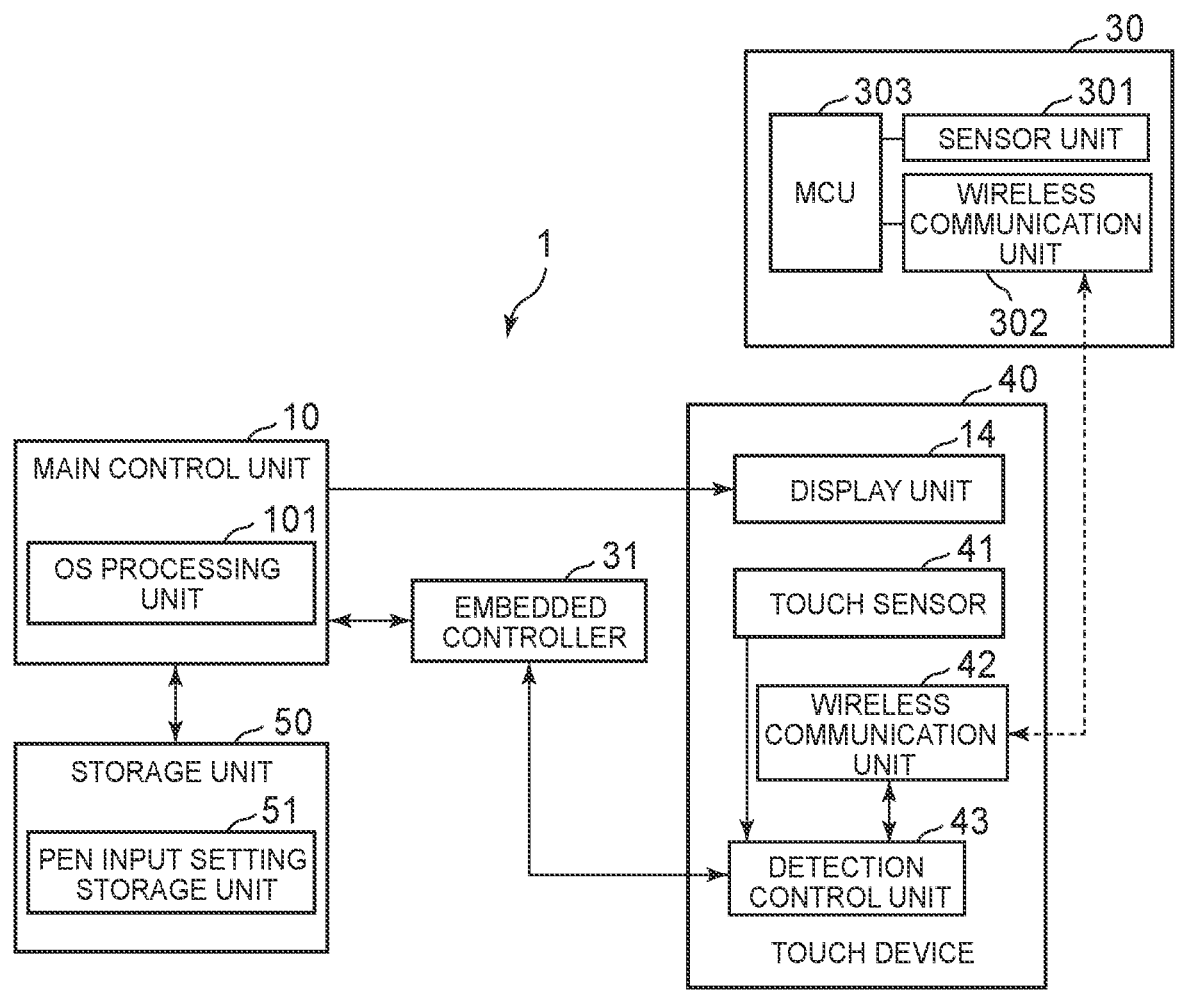
FIG. 3 is a block diagram illustrating an example of the functional configuration of the laptop PC according one or more embodiments.

FIG. 3 is a block diagram illustrating an example of the functional configuration of the laptop PC 1 according to one or more embodiments. As illustrated in FIG. 3, the laptop PC 1 includes the main control unit 10, the embedded controller 31, the pen 30, the touch device 40, and a storage unit 50.

Further, the pen 30 includes the sensor unit 301, the wireless communication unit 302, and the MCU 303, and the touch device 40 includes the display unit 14, the touch sensor 41, the wireless communication unit 42, and the detection control unit 43.

The detection control unit 43 of the touch device 40 is capable of detection by the pen input detection using the touch sensor 41 and the wireless communication unit 42 and by the touch input detection based on a contact of the finger by the touch sensor 41. Here, the states of the pen 30 and of touching by a finger will be described with reference to FIGS. 4A-4C.

Figure 4A:
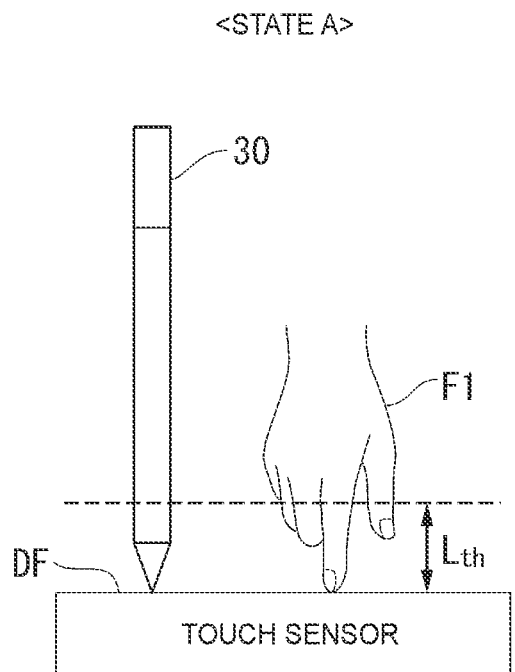
FIGS. 4A-4C are diagrams illustrating exemplary states of a touch device based on a pen and touch according to one or more embodiments.
Figure 4B:
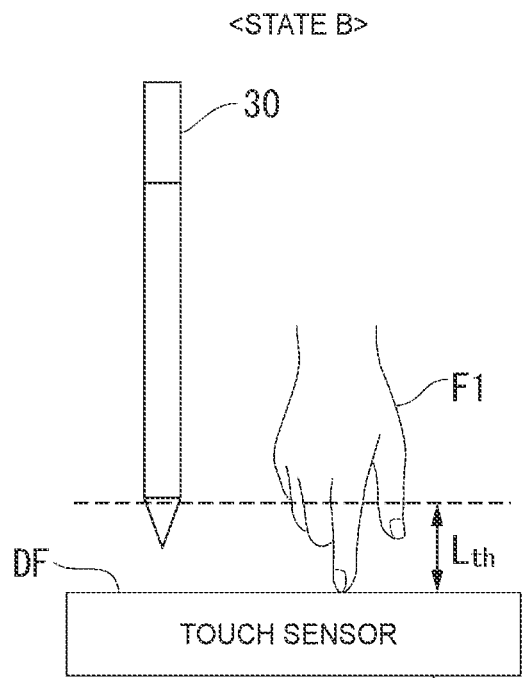
Figure 4C:
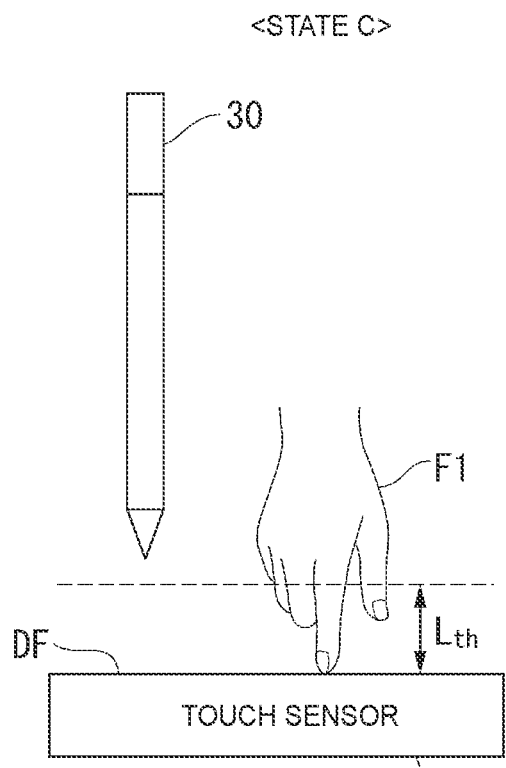

FIGS. 4A-4C show diagrams illustrating exemplary states of the touch device 40 based on the pen 30 and touch according to one or more embodiments.

FIG. 4A illustrates, as a state A, a state in which both the pen 30 and a finger of the user's hand F1 are in contact with the detection surface (screen DF) of the touch sensor 41.

FIG. 4B illustrates, as a state B, a state in which the pen 30 has approached within a threshold distance Lth on the detection surface (screen DF) of the touch sensor 41 and is not in contact with the detection surface (screen DF) and a finger of the hand F1 is in contact with the detection surface (screen DF). The detection control unit 43 detects whether the pen 30 has approached within the threshold distance Lth by data communication with the pen 30 by the wireless communication unit 42.

FIG. 4C illustrates, as a state C, a state in which the pen 30 is away from the detection surface (screen DF) of the touch sensor 41 by the threshold distance Lth or more and a finger of the hand F1 is in contact with the detection surface (screen DF).

As illustrated in FIGS. 4A-4C, in the state where a finger of the hand F1 is in contact with the detection surface (screen DF), the detection control unit 43 can distinguishably detect the state A, the state B, and the state C depending on the distance of the pen 30.

Returning to the explanation of FIG. 3, the detection control unit 43 executes detection in a time division detection mode (first mode) in the case of, for example, the state B described above (FIG. 4B). In other words, in the state where an approach of the pen 30 is detected and the pen 30 is not in contact with the screen DF and the finger is in contact with the screen DF, the detection control unit 43 executes the detection in the time division detection mode.

It should be noted that the time division detection mode is a detection mode in which the pen input detection and the touch input detection are performed in a time-division manner.

The detection control unit 43 changes the mode to a full period pen detection mode (second mode) in the case of, for example, the state A described above (FIG. 4A). In other words, in response to a transition to a state where the pen 30 is in contact with the screen DF and the finger is in contact with the screen DF, the detection control unit 43 changes the mode to the full period pen detection mode in which the pen input detection is performed for the entire detection period.

It should be noted that the full period pen detection mode is a detection mode in which the pen input detection is performed for the entire detection period, without the touch input detection. In the full period pen detection mode, the detection control unit 43 repeats the pen detection processing of performing detection of a contact position of the pen 30 by the touch sensor 41 and detection of approach and contact of the pen 30 via the wireless communication unit 42 over the entire detection period.

Here, a difference between the detection processing in the time division detection mode in the state B and the detection processing in the full period pen detection mode in the state A will be described with reference to FIG. 5.

Figure 5:
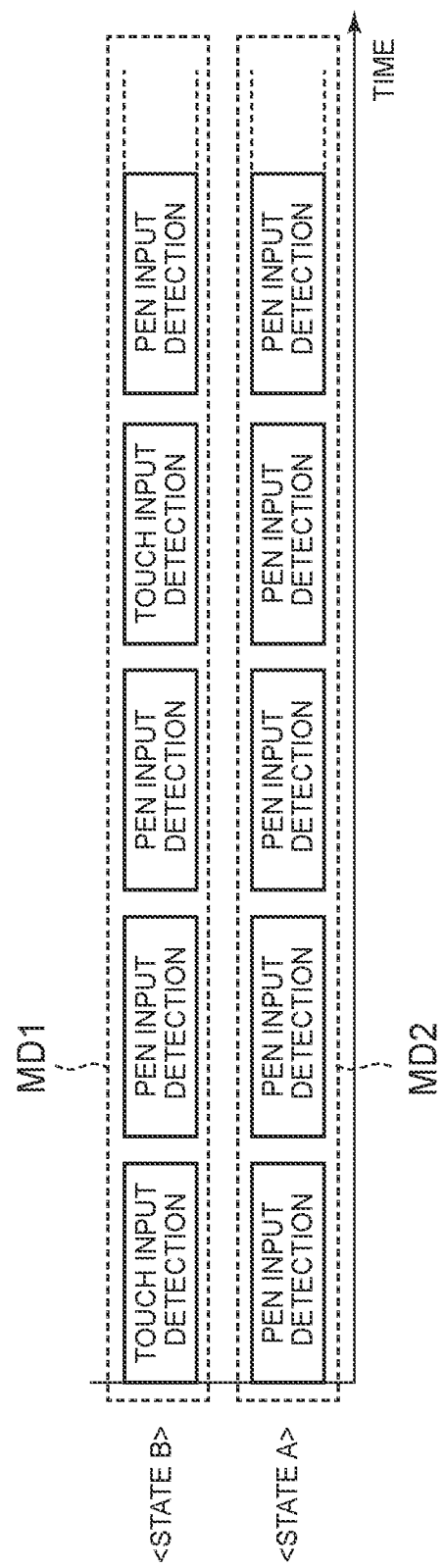
FIG. 5 is a diagram illustrating an example of detection processing of the touch device according to one or more embodiments.

FIG. 5 is a diagram illustrating an example of detection processing of the touch device according to one or more embodiments.

In FIG. 5, the horizontal axis represents time and the vertical axis represents detection processing in the state B and the state A.

As illustrated in FIG. 5, in the time division detection mode MD1 in the state B, the detection control unit 43 executes the touch input detection once out of three consecutive detections and the pen input detection in the remaining two detections.

In the full period pen detection mode MD2 in the state A, the detection control unit 43 executes the pen input detection during the entire detection period.

In the case where an approach of the pen 30 has not been detected and the finger is in contact with the screen DF (state C (FIG. 4C)), or in the case where the approach of the pen 30 has been detected and the finger is not in contact with the screen DF, the detection control unit 43 executes detection in the time division detection mode.

The state transition of the detection mode of the touch device 40 will now be described with reference to FIG. 6.

Figure 6:
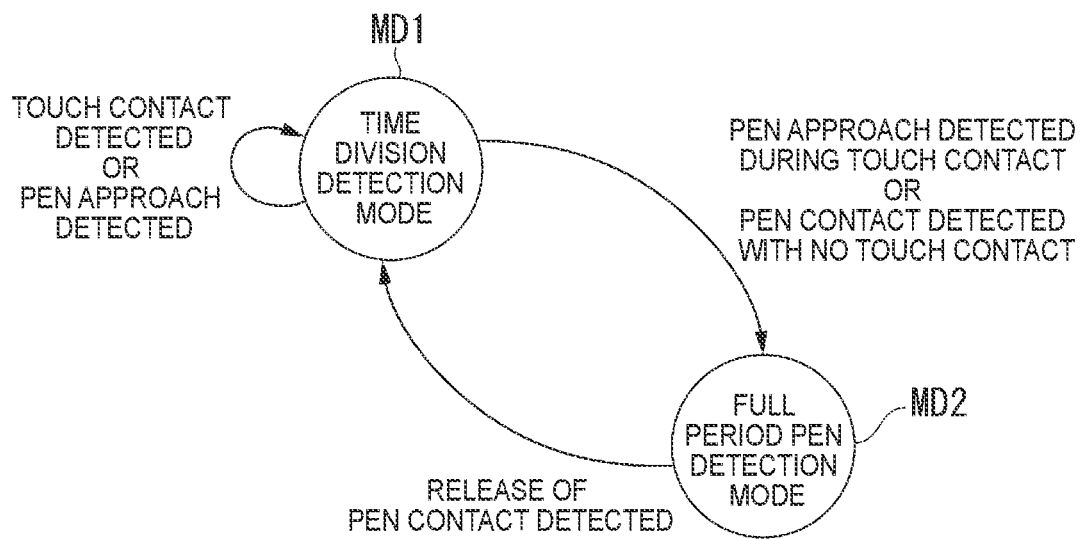
FIG. 6 is a diagram illustrating an example of the state transition of the detection mode of the touch device according to one or more of embodiments.

FIG. 6 is a diagram illustrating an example of the state transition of the detection mode of the touch device 40 according to one or more embodiments.

As illustrated in FIG. 6, in the time division detection mode MD1, in the case where a pen contact is detected during the touch contact on the screen DF, or in the case where a pen contact is detected without a touch contact on the screen DF, the detection control unit 43 changes the mode to the full period pen detection mode MD2.

Further, in the full period pen detection mode MD2, in the case where a release of the pen contact on the screen DF is detected, the detection control unit 43 changes the mode to the time division detection mode MD1.

Furthermore, in the time division detection mode MD1, in the case where a touch contact on the screen DF or an approach of the pen 30 to the screen DF is detected, the detection control unit 43 maintains the time division detection mode MD1.

Returning again to the explanation of FIG. 3, the detection control unit 43 transmits detection data of the pen input detection (pen input detection data) and detection data of the touch input detection (touch input detection data) to the main control unit 10 via the embedded controller 31.

The storage unit 50 is a storage unit implemented by, for example, the main memory 12 or the SSD 23, and stores various information used by the laptop PC 1. For example, the storage unit 50 temporarily stores various information used by various applications and input information acquired using the touch device 40 (pen input detection data, touch input detection data, and the like). The storage unit 50 also stores various setting information of the OS.

The storage unit 50 includes a pen input setting storage unit 51.

The pen input setting storage unit 51 is a storage unit implemented by the main memory 12 or the SSD 23, and stores setting information for disabling a touch input operation when a pen input operation and a touch input operation are to be performed simultaneously. The pen input setting storage unit 51 stores pen input setting information that is set by a user on a setting screen of the OS.

The main control unit 10 is a functional unit implemented by the CPU 11 and the chipset 21 executing a program stored in the main memory 12, and executes various processing based on the OS. For example, the main control unit 10 executes various processing using the touch input detection data and the pen input detection data detected by the touch device 40 as input information.

The main control unit 10 includes an OS processing unit 101.

The OS processing unit 101 mainly executes processing based on the OS. For example, the OS processing unit 101 executes changing the setting information for the OS according to a user operation. The OS processing unit 101 acquires pen input setting information set by the user on the OS setting screen (for example, setting information for disabling a touch input operation when a pen input operation and a touch input operation are to be performed simultaneously). The OS processing unit 101 stores the acquired pen input setting information in the pen input setting storage unit 51.

Further, in the case where a setting to disable a touch input operation during the use of the pen 30 has been made in the OS in accordance with the pen input setting information stored in the pen input setting storage unit 51, the OS processing unit 101 executes processing to ignore the touch input detection data while the pen input detection is performed. In other words, in the case where the setting information for disabling the touch input detection is set as the pen input setting information, the OS processing unit 101 discards any touch input detection data acquired from the touch device 40 to thereby disable the touch input detection.

An operation of the laptop PC 1 according to one or more embodiments will now be described with reference to the drawings.

First, an operation of the touch device 40 included in the laptop PC 1 will be described.

Figure 7:
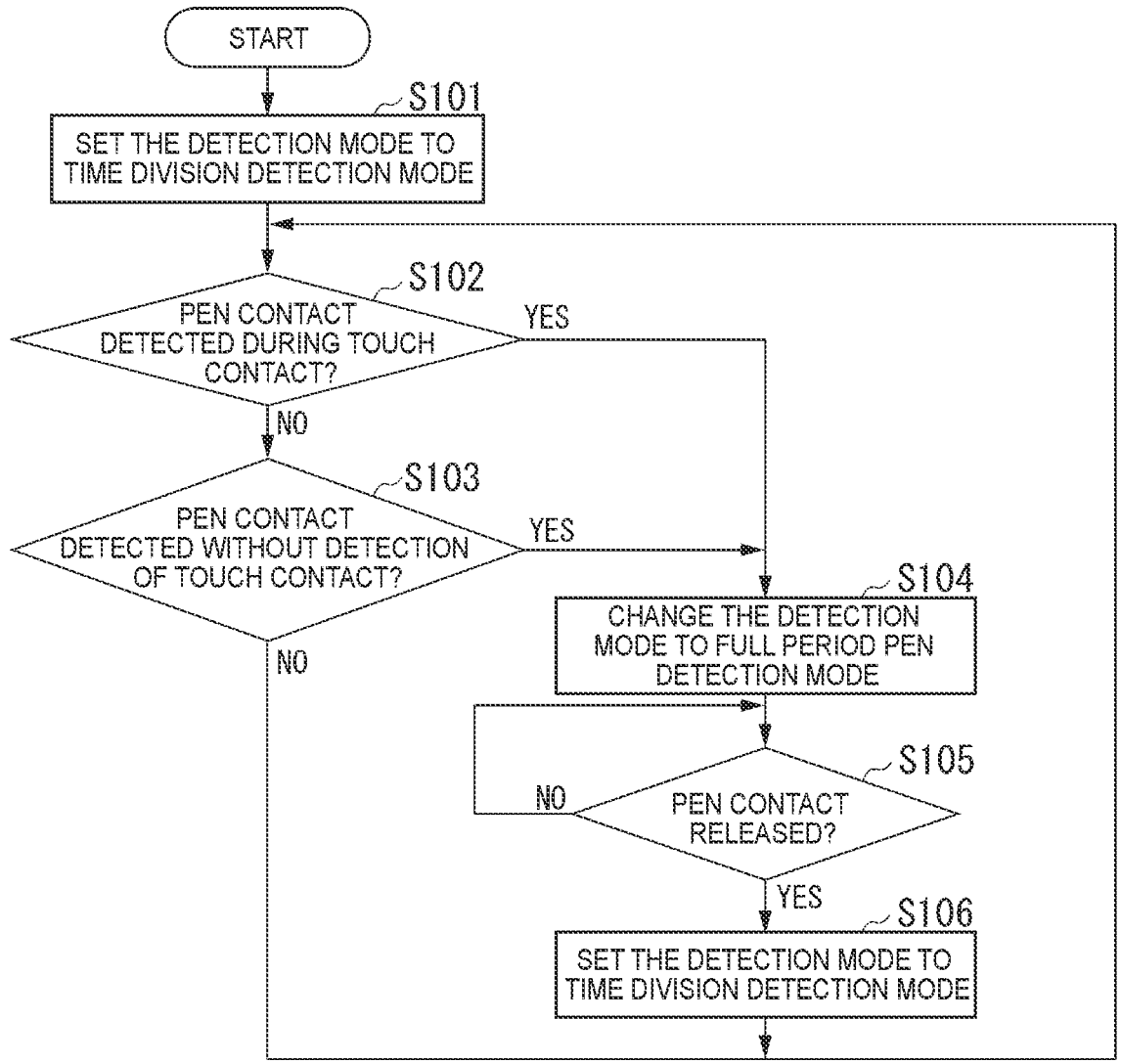
FIG. 7 is a flowchart illustrating an example of detection mode switching processing of the touch device according to one or more embodiments.

FIG. 7 is a flowchart illustrating an example of detection mode switching processing of the touch device 40 according to one or more embodiments.

As illustrated in FIG. 7, the detection control unit 43 of the touch device 40 first sets the detection mode to the time division detection mode MD1 (step S101). The detection control unit 43 stores information indicative of the time division detection mode MD1 in a storage unit (not illustrated) of the touch device 40.

Subsequently, the detection control unit 43 determines whether a contact of the pen 30 has been detected during the touch contact (step S102). The detection control unit 43 determines whether the above-described state A has been reached on the basis of the detection results of the touch sensor 41 and the data communication with the pen 30 by the wireless communication unit 42. In the case where the contact of the pen 30 is detected during the touch contact (which is the state A) (YES in step S102), the detection control unit 43 advances the processing to step S104. In the case where the contact of the pen 30 is not detected during the touch contact (NO in step S102), the detection control unit 43 advances the processing to step S103.

In step S103, the detection control unit 43 determines whether a contact of the pen 30 has been detected while no touch contact is detected. The detection control unit 43 determines whether the contact of the pen 30 has been detected while no touch contact is detected, on the basis of the detection results of the touch sensor 41 and the data communication with the pen 30 by the wireless communication unit 42. In the case where the contact of the pen 30 is detected while the touch contact is not detected (YES in step S103), the detection control unit 43 advances the processing to step S104. In the case where the contact of the pen 30 is not detected while the touch contact is not detected (NO in step S103), the detection control unit 43 returns the processing to step S102.

In step S104, the detection control unit 43 changes the detection mode to the full period pen detection mode MD2. That is, the detection control unit 43 stores information indicative of the full period pen detection mode MD2 in the storage unit (not illustrated) of the touch device 40.

Subsequently, the detection control unit 43 determines whether the contact of the pen 30 has been released (step S105). The detection control unit 43 determines whether the contact of the pen 30 on the screen DF is no longer detected, on the basis of the detection results of the touch sensor 41 and the data communication with the pen 30 by the wireless communication unit 42. In the case where the contact of the pen 30 is released (the contact of the pen 30 is no longer detected) (YES in step S105), the detection control unit 43 advances the processing to step S106. In the case where the contact of the pen 30 is not released (the contact of the pen 30 is detected) (NO in step S105), the detection control unit 43 returns the processing to step S105.

In step S106, the detection control unit 43 changes the detection mode to the time division detection mode MD1. That is, the detection control unit 43 stores information indicative of the time division detection mode MD1 in the storage unit (not illustrated) of the touch device 40. After the processing in step S106, the detection control unit 43 returns the processing to step S102.

The disabling processing of a touch input operation in the laptop PC 1 will now be described with reference to FIG. 8.

Figure 8:
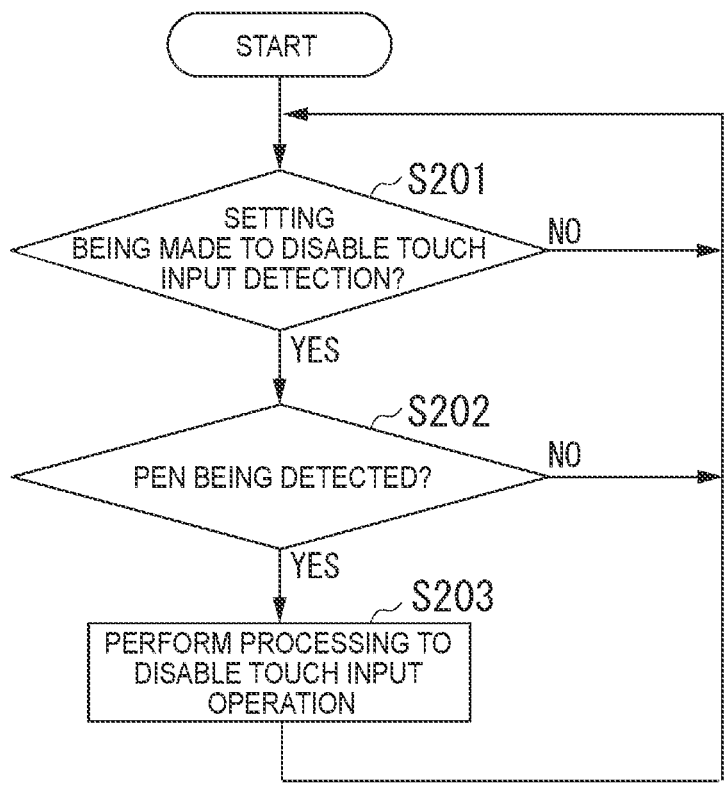
FIG. 8 is a flowchart illustrating an example of touch input operation disabling processing of the laptop PC according to one or more embodiments.

FIG. 8 is a flowchart illustrating an example of touch input operation disabling processing of the laptop PC 1 according to one or more embodiments.

As illustrated in FIG. 8, the OS processing unit 101 of the laptop PC 1 first determines whether the setting for disabling the touch input detection has been made (step S201). The OS processing unit 101 refers to the pen input setting storage unit 51 to determine whether the setting for disabling the touch input detection (touch input operation) has been made. In the case where the setting for disabling the touch input detection (touch input operation) has been made (YES in step S201), the OS processing unit 101 advances the processing to step S202. In the case where the setting for disabling the touch input detection (touch input operation) has not been made (NO in step S201), the OS processing unit 101 returns the processing to step S201.

In step S202, the OS processing unit 101 determines whether the pen 30 is being detected. The OS processing unit 101 determines whether the pen 30 is being detected according to whether or not it is detected by the touch device 40 that the pen 30 approaches within the threshold distance Lth to the screen DF, or the pen 30 is in contact with the screen DF. In the case where the pen 30 is being detected (YES in step S202), the OS processing unit 101 advances the processing to step S203. In the case where the pen 30 is not being detected (NO in step S202), the OS processing unit 101 returns the processing to step S201.

In step S203, the OS processing unit 101 performs processing to disable the touch input operation. That is, in the case where a touch input is detected by the touch device 40, the OS processing unit 101 discards the acquired touch input detection data to thereby disable the touch input operation. After the processing in step S203, the OS processing unit 101 returns the processing to step S201.

The effects of the laptop PC 1 and the touch device 40 of one or more embodiments will now be described with reference to FIGS. 9 and 10.

Figure 9:
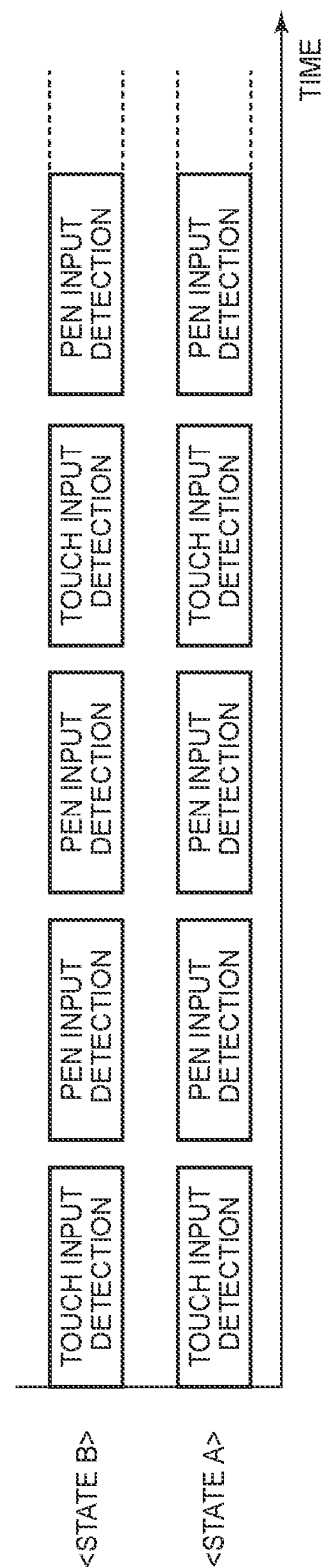
FIG. 9 is a diagram illustrating an example of detection processing of a comparative touch device.

FIG. 9 is a diagram illustrating an example of detection processing by a comparative touch device. Here, the detection processing by a comparative touch device is described for comparison with the laptop PC 1 and the touch device 40 of one or more embodiments.

As illustrated in FIG. 9, in the touch device of the comparative technology, the detection processing in the time division detection mode is executed in both the state A and the state B illustrated in FIGS. 4A and 4B, respectively. On the other hand, in the touch device 40 according to one or more embodiments, as illustrated in FIG. 5, the detection control unit 43 executes the detection processing in the full period pen detection mode in the state A. The sampling rate (sampling frequency) of the pen input detection is higher in the detection processing in the full period pen detection mode than in the detection processing in the time division detection mode. Thus, the touch device 40 according to one or more embodiments can achieve a high sampling rate.

FIG. 10 is a diagram illustrating an example of the effects of the laptop PC according to one or more embodiments.

In FIG. 10, the sampling rate in pen input detection and the sampling rate in touch input detection are compared between the touch device of a comparative technology and the touch device 40 according to one or more embodiments in the state A and the state B illustrated in FIGS. 4A and 4B, respectively.

As illustrated in FIG. 10, in the comparative technology, the sampling rate in the pen input detection is a sampling rate SR1 and the sampling rate in the touch input detection is a sampling rate SR2 in the state A and the state B. Here, the sampling rate SR1 is higher than the sampling rate SR2 (SR1>SR2).

In one or more embodiments, in the state B, the sampling rate in the pen input detection is the sampling rate SR1 and the sampling rate in the touch input detection is the sampling rate SR2, as in the comparative technology. However, in one or more embodiments, in the state A, the sampling rate in the pen input detection is a sampling rate SR3, and the sampling rate in the touch input detection is "0". Here, the sampling rate SR3 is higher than the sampling rate SR1 (SR3>SR1).

In the touch device 40 according to one or more embodiments, when the detection processing is performed in the full period pen detection mode as illustrated in FIG. 5, for example, the sampling rate SR3 is about 1.5 times (about 3/2 times) the sampling rate SR1.

Thus, the touch device 40 according to one or more embodiments is capable of achieving a high sampling rate in the pen input detection compared to the touch device of the comparative technology.

As described above, the laptop PC 1 (information processing apparatus) according to one or more embodiments includes the touch device 40 and the main control unit 10. The main control unit 10 is a main control unit that executes processing based on an OS, and executes processing of a pen input operation based on pen input detection data detected by the touch device 40 and processing of a touch input operation based on touch input detection data detected by the touch device 40. The touch device 40 includes the display unit 14, the touch sensor 41, the wireless communication unit 42, and the detection control unit 43. The touch sensor 41 is disposed on the screen DF of the display unit 14 and is capable of detecting a contact position of a finger and a contact position of the pen 30 on the screen DF in a shared manner. The wireless communication unit 42 is capable of detecting an approach of the pen 30 that has approached within a threshold distance on the screen DF of the display unit 14 and a position of the pen 30 on the screen DF by contactless data communication with the pen 30. The detection control unit 43 controls pen input detection using the touch sensor 41 and the wireless communication unit 42 and touch input detection based on a contact of the finger by the touch sensor 41. The detection control unit 43 executes detection in the time division detection mode (first mode) in a state where an approach of the pen 30 is detected and the pen 30 is not in contact with the screen DF and the finger is in contact with the screen DF, and changes the mode to the full period pen detection mode (second mode) in response to a transition to a state where the pen 30 is in contact with the screen DF and the finger is in contact with the screen DF. In the time division detection mode (first mode), the pen input detection and the touch input detection are performed in a time-division manner. In the full period pen detection mode (second mode), the pen input detection is performed for an entire detection period.

In this manner, by using the full period pen detection mode (second mode), the laptop PC 1 (information processing apparatus) according to one or more embodiments can achieve a high sampling rate in the pen input detection, as illustrated in FIG. 10 explained above. Therefore, the laptop PC 1 (information processing apparatus) according to one or more embodiments is capable of achieving a high sampling rate even in the case where a pen input operation and a touch input operation are performed simultaneously.

Further, since the laptop PC 1 according to one or more embodiments is capable of achieving a high sampling rate in the pen input detection, the delay in the display of the pen movement trajectory by the pen 30 can be reduced.

Further, in the laptop PC 1 according to one or more embodiments, using the full period pen detection mode (second mode) in the state where the pen 30 is in contact with the screen DF can reduce a pen jumping event in which the positional information of the touch input detection is erroneously detected as the positional information of the pen input detection and the movement trajectory of the pen 30 jumps to the touched position.

Further, in one or more embodiments, the detection control unit 43 executes detection in the time division detection mode in the case where no approach of the pen 30 is detected and the finger is in contact with the screen DF, or in the case where the approach of the pen 30 is detected and the finger is not in contact with the screen DF.

In this manner, the laptop PC 1 according to one or more embodiments can achieve a high sampling rate in the pen input detection, while supporting simultaneous detection of a pen input operation and a touch input operation by the time division detection mode.

Further, in one or more embodiment, in the case where a setting is made in the OS to disable a touch input operation at the time of using the pen 30, the main control unit 10 executes processing to ignore the touch input detection data while the pen input detection is performed.

In this manner, the laptop PC 1 according to one or more embodiments can appropriately support the setting in the OS to disable the touch input operation at the time when the pen 30 is to be used. For example, in a comparative technology, in the case where the pen input operation and the touch input operation are performed simultaneously, the sampling rate becomes low, so, for example, in the setting in the OS (e.g., Windows (registered trademark)), the setting menu for disabling the touch input operation when the pen input operation and the touch input operation are to be performed simultaneously may have been masked so as not to be visible. In contrast, in the laptop PC 1 according to one or more embodiments, a high sampling rate can be achieved even in the case where a pen input operation and a touch input operation are performed simultaneously, thus eliminating the need for such OS customization.

Further, the touch device 40 according to one or more embodiments includes the display unit 14, the touch sensor 41, the wireless communication unit 42, and the detection control unit 43. The touch sensor 41 is disposed on the screen DF of the display unit 14 and is capable of detecting a contact position of a finger and a contact position of the pen 30 on the screen DF in a shared manner. The wireless communication unit 42 is capable of detecting an approach of the pen 30 that has approached within a threshold distance on the screen DF of the display unit 14 and a position of the pen 30 on the screen DF by contactless data communication with the pen 30. The detection control unit 43 controls pen input detection using the touch sensor 41 and the wireless communication unit 42 and touch input detection based on a contact of the finger by the touch sensor 41. The detection control unit 43 executes detection in the time division detection mode (first mode) in a state where an approach of the pen 30 is detected and the pen 30 is not in contact with the screen DF and the finger is in contact with the screen DF, and changes the mode to the full period pen detection mode (second mode) in response to a transition to a state where the pen 30 is in contact with the screen DF and the finger is in contact with the screen DF. In the time division detection mode (first mode), the pen input detection and the touch input detection are performed in a time-division manner. In the full period pen detection mode (second mode), the pen input detection is performed for the entire detection period.

Thus, the touch device 40 according to one or more embodiments has effects similar to those of the laptop PC 1 described above, and can achieve a high sampling rate even in the case where a pen input operation and a touch input operation are performed simultaneously.

Further, the control method according to one or more embodiments is a control method for controlling the touch device 40 which includes the display unit 14, the touch sensor 41 disposed on the screen DF of the display unit 14 and capable of detecting a contact position of a finger and a contact position of the pen 30 on the screen DF in a shared manner, the wireless communication unit 42 capable of detecting an approach of the pen 30 that has approached within a threshold distance on the screen DF of the display unit 14 and a position of the pen 30 on the screen DF by contactless data communication with the pen 30, and the detection control unit 43 that controls the pen input detection using the touch sensor 41 and the wireless communication unit 42 and the touch input detection based on a contact of the finger by the touch sensor 41, wherein the method includes a first processing step and a second processing step. In the first processing step, in a state where an approach of the pen 30 is detected and the pen 30 is not in contact with the screen DF and the finger is in contact with the screen DF, the detection control unit 43 executes detection in a time division detection mode in which the pen input detection and the touch input detection are performed in a time-division manner. In the second processing step, in response to a transition to a state where the pen 30 is in contact with the screen DF and the finger is in contact with the screen DF, the detection control unit 43 changes the mode to a full period pen detection mode in which the pen input detection is performed for the entire detection period.

Thus, the control method according to one or more embodiments has effects similar to those of the laptop PC 1 described above, and can achieve a high sampling rate even in the case where a pen input operation and a touch input operation are performed simultaneously.

It should be noted that the present invention is not limited to the above one or more embodiments; rather, modifications are possible within the range not departing from the gist of the present invention.

For example, while the case where the information processing apparatus is the laptop PC 1 has been described in the above one or more embodiments, the information processing apparatus is not limited thereto; it may be, for example, a tablet terminal, liquid crystal pen tablet, smartphone, or other information processing apparatus.

Further, while the case where the OS of the laptop PC 1 is Windows (registered trademark) has been described in the above one or more embodiments, not limited thereto, Android (registered trademark) or other OS is applicable.

Further, while the case where the touch device 40 is built into the laptop PC 1 has been described in the above one or more embodiments, the configuration is not limited thereto; the touch device 40 may be an externally mounted device.

It should be noted that the components included in the above-described laptop PC 1 and touch device 40 each have a computer system therein. A program for implementing the function of each component included in the laptop PC 1 and the touch device 40 may be recorded on a computer-readable recording medium, and the program recorded on the recording medium may be read and executed by the computer system to perform the processing in each component included in the laptop PC 1 and the touch device 40. Here, that "the program recorded on the recording medium (is) read and executed by the computer system" includes that the program is installed in the computer system. As used herein, the "computer system" includes the OS and hardware such as peripheral devices and the like.

Further, the "computer system" may include a plurality of computer devices connected via a network including the Internet, WAN, LAN, dedicated line, or other communication line. The "computer-readable recording medium" refers to a storage device including a portable medium such as a flexible disk, a magneto-optical disk, a ROM, a CD-ROM, and the like, and a hard disk built in the computer system.

As such, the recording medium storing the program may be a CD-ROM or other non-transitory recording medium.

The recording medium also includes an internally or externally provided recording medium that is accessible from a distribution server for distributing the program. It should be noted that the program may be divided into a plurality of parts, which may be downloaded at different times and then combined in each component included in the laptop PC 1 and the touch device 40. The divided parts of the program may be distributed by different distribution servers. It is further assumed that the "computer-readable recording medium" includes a medium that holds a program for a predetermined period of time, such as a volatile memory (RAM) within the computer system that serves as a server or as a client in the case where the program is transmitted over a network. The above-described program may be a program for implementing some of the above-described functions. Furthermore, the program may be a so-called differential file (differential program) that can implement the above-described functions in combination with the program(s) already recorded in the computer system.

Further, some or all of the above-described functions may be implemented as an integrated circuit such as a large scale integration (LSI). Each of the above functions may be formed individually as a processor, or some or all of the functions may be integrated into a processor. The circuit integration technique is not limited to the LSI; it may be implemented using a dedicated circuit or a general-purpose processor. Moreover, if a circuit integration technology replacing the LSI emerges with the advancement of the semiconductor technology, an integrated circuit according to that technology may be used.

DESCRIPTION OF SYMBOLS 1 laptop PC
10 main control unit
11 CPU
12 main memory
13 video subsystem
14 display unit
21 chipset
22 BIOS memory
23 SSD
24 USB connector
25 audio system
26 WLAN card
30 pen
31 embedded controller
32 input unit
34 power supply circuit
35, 301 sensor unit
40 touch device
41 touch sensor
42, 302 wireless communication unit
43 detection control unit
50 storage unit
51 pen input setting storage unit
101 OS processing unit
303 MCU
DF screen

What is claimed is:
1. An information processing apparatus comprising:
a touch device; and
a main controller that executes processing based on an operating system (OS), the main controller executing processing of a pen input operation based on pen input detection data detected by the touch device and processing of a touch input operation based on touch input detection data detected by the touch device,
wherein the touch device comprises:
a display;
a touch sensor disposed on a screen of the display and capable of detecting a contact position of a finger and a contact position of a pen on the screen in a shared manner;
a wireless communication capable of detecting an approach of the pen that has approached within a threshold distance on the screen of the display and a position of the pen on the screen by contactless data communication with the pen; and
a detection controller that controls:
pen input detection using the touch sensor and the wireless communication, and
touch input detection based on a contact of the finger by the touch sensor,
wherein the detection controller is operable, in a state where an approach of the pen is detected and the pen is not in contact with the screen and the finger is in contact with the screen, to:
execute detection in a first mode in which the pen input detection and the touch input detection are performed in a time-division manner, and
in response to a transition to a state where the pen is in contact with the screen and the finger is in contact with the screen, change the first mode to a second mode in which the pen input detection is performed for an entire detection period,
wherein the pen input detection is performed at a first sampling rate in the first mode and at a second sampling rate in the second mode, the second sampling rate being higher than the first sampling rate.

2. The information processing apparatus according to claim 1, wherein the detection controller executes detection in the first mode in a case where no approach of the pen is detected and the finger is in contact with the screen, or in a case where the approach of the pen is detected and the finger is not in contact with the screen.

3. The information processing apparatus according to claim 1, wherein in a case where a setting is made in the OS to disable the touch input operation while the pen is to be used, the main controller executes processing to ignore the touch input detection data while the pen input detection is performed.

4. A touch device comprising:
a display;
a touch sensor disposed on a screen of the display and capable of detecting a contact position of a finger and a contact position of a pen on the screen in a shared manner;
a wireless communication capable of detecting an approach of the pen that has approached within a threshold distance on the screen of the display and a position of the pen on the screen by contactless data communication with the pen; and
a detection controller that controls:
pen input detection using the touch sensor, the wireless communication, and the touch input detection based on a contact of the finger by the touch sensor,
wherein the detection controller is operable:
in a state where an approach of the pen is detected and the pen is not in contact with the screen and the finger is in contact with the screen, to execute detection in a first mode in which the pen input detection and the touch input detection are performed in a time-division manner, and
in response to a transition to a state where the pen is in contact with the screen and the finger is in contact with the screen, to change the mode to a second mode in which the pen input detection is performed for an entire detection period, and
wherein the pen input detection is performed at a first sampling rate in the first mode and at a second sampling rate in the second mode, the second sampling rate being higher than the first sampling rate.

5. A control method for controlling a touch device, the touch device including a display, a touch sensor disposed on a screen of the display and capable of detecting a contact position of a finger and a contact position of a pen on the screen in a shared manner, a wireless communication capable of detecting an approach of the pen that has approached within a threshold distance on the screen of the display and a position of the pen on the screen by contactless data communication with the pen, and a detection controller that controls pen input detection using the touch sensor and the wireless communication and touch input detection based on a contact of the finger by the touch sensor, the method comprising:
executing detection, by the detection controller, in a first mode in which the pen input detection and the touch input detection are performed in a time-division manner in a state where an approach of the pen is detected and the pen is not in contact with the screen and the finger is in contact with the screen;
changing, by the detection controller, the first mode to a second mode in which the pen input detection is performed for an entire detection period in response to a transition to a state where the pen is in contact with the screen and the finger is in contact with the screen,
wherein the pen input detection is performed at a first sampling rate in the first mode and at a second sampling rate in the second mode, the second sampling rate being higher than the first sampling rate.

* * * * *